(No Model.)

C. BULLOCK.
COVERING FOR CABLES OR ROPES USED TO PROPEL VEHICLES.

No. 314,995.  Patented Apr. 7, 1885.

Witnesses
John T. DeBeese
Howard Wagner

Inventor
Chester Bullock

UNITED STATES PATENT OFFICE.

CHESTER BULLOCK, OF NEW YORK, N. Y.

COVERING FOR CABLES OR ROPES USED TO PROPEL VEHICLES.

SPECIFICATION forming part of Letters Patent No. 314,995, dated April 7, 1885.

Application filed July 7, 1884. (No model.)

*To all whom it may concern:*

Be it known that I, CHESTER BULLOCK, a citizen of the United States, residing at New York city, in the county of New York and State of New York, have invented a new and useful Covering for Cables or Ropes Used to Propel Vehicles, of which the following is a specification.

My invention relates to a covering for cables or ropes used to propel vehicles, to protect them from wear while passing over sheaves or pulleys or any other substance with which they might come in contact while in motion, and said cable or ropes still retain their flexibility; also from the wear of a grip or any other mechanical device that may be used or applied to connect or attach to a street car or cars, wagon, truck, or any other kind of a vehicle to be propelled by a cable or rope. I attain these objects by the mechanism illustrated in the accompanying drawings, in which—

Figure 1:
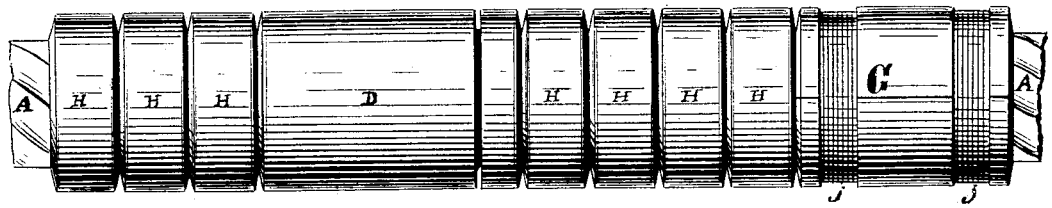
Figure 2:
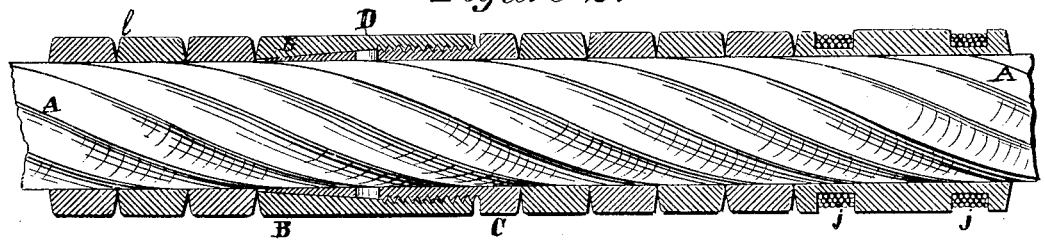
Figure 3:
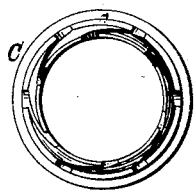
Figure 4:
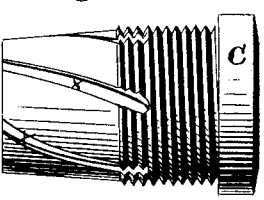
Figure 7:
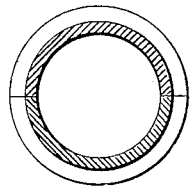
Figure 8:
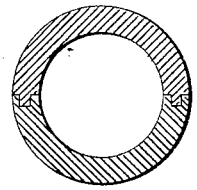
Figure 5:
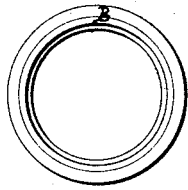
Figure 6:
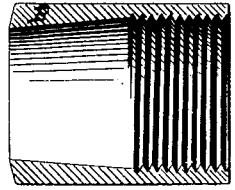
Figure 9:
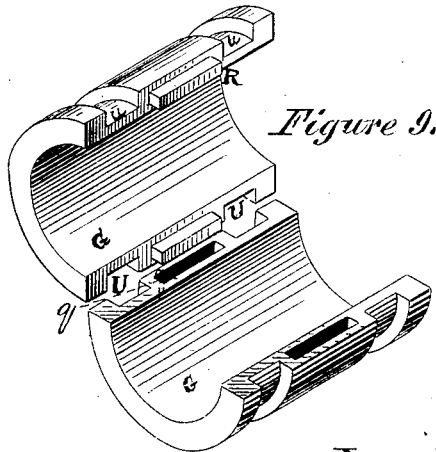
Figure 10:
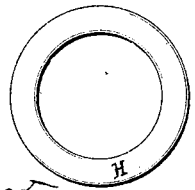

Figure 1 is a section of the cable or rope covered and protected by rings. Fig. 2 is a view of said section of the cable or rope with the front half of the rings cut away. Fig. 3 is an end view of the male part of a clutch-ring. Fig. 4 is a side view of the male part of a clutch-ring. Fig. 5 is an end view of the female part of a clutch-ring. Fig. 6 is a side view of the female part of a clutch-ring with the front half cut away. Fig. 7 is an end view of a part of a sectional ring in place, divided in one of the grooves made for the wire to hold the parts of a sectional ring together. Fig. 8 is an end view of a part of a sectional ring in place, divided in the center through the mortise and tenon. Fig. 9 is a view in perspective of both parts of a sectional ring before being placed together. Fig. 10 is an end view of a plain ring.

Similar letters refer to similar parts throughout the several views.

Cable or rope A, with rings D, H, and G, represent a section of the cable or rope protected by metallic rings from wear of its outer strands or wires and retaining its flexibility. Clutch-ring D is made of strong metal and in two parts—female part B and male part C. The female part B is a hollow cylinder whose canal for one half its length is cylindrical, with a thread or screw cut on its inner surface, while the other half is of the shape of the frustum of a cone and made smooth, whose minimum diameter at the end is commensurate with that of the cable or rope, and increases in diameter to the center or cylindrical part, whose diameter is enough larger than the cable or rope to admit the male part C, as hereinafter described. The male part C is a hollow cylinder whose diameter is commensurate with that of the cable or rope, one end of which is a plain rim the thickness of plain ring, Fig. 10. From this rim the diameter is reduced, one half the distance of which is made commensurate to that of the cylindrical part of the canal of the female part B, with thread cut to fit into those of the thread or screws in female part B, while the other half is the frustum of a hollow cone provided with slots $x\,x$, running in a course corresponding with the strands of a cable or rope. The frustum of this cone is made thicker than the place left in the female part B for its reception, that when the parts—female part B and male part C—are in place and screwed together the frustum of the cone of the male part C will be pressed down and grip the cable or rope, creating sufficient friction to cause the clutch-ring D to be stationary on the cable or rope, as represented in Fig. 1 by clutch-ring D.

Figs. 7, 8, and 9 refer to sectional ring G, that is made of metal and in two parts, each part being one half of a ring, one having a tenon, R, on the center of each edge, while the other half has a mortise, $q$, in each edge corresponding with that of the former. When these parts are placed together, the tenons R fit into the mortise $q$ and form a ring. On the outside, and around these parts, and near each end, grooves $u\,u$ are made for the reception of wires $j\,j$, to bind and hold the parts firmly together, forming sectional ring G, as shown in Figs. 1 and 2. When these parts are placed on the cable or rope, small wires $j\,j$ are wound around the parts in grooves $u\,u$ and fastened together. Plain ring H is made of metal the size and thickness of the other rings, but shorter, and large enough to slide easily on the cable or rope. All the rings are beveled on the edge, as represented by letter $l$ in Fig. 2, to allow the cable or rope to retain its flexibility.

The clutch-ring D and sectional ring G can be made two inches in length, while plain ring H had best not be more than three-fourths of an inch in length; but all the rings must be of uniform thickness or diameter when placed on the cable or rope, as represented in Fig. 1.

The parts of clutch-ring D are placed on and firmly secured to the cable or rope by being screwed together, and then followed by plain rings H for about one hundred feet, when another clutch-ring is placed on the cable or rope, as before, and followed by another hundred feet of plain rings and so on, the clutch-rings being placed about one hundred feet apart and filled in with the plain rings to near the ends of the cable or rope, when they are to be joined to make it continuous. After the ends of the cable or rope have been joined the lap and portion not filled is then covered by the sectional rings G, that are placed on the cable or rope, firmly bound together by wires $j j$ in grooves $u u$. The ends of the wire are twisted together and protected in grooves $u u$; also, sectional rings G are to be used when repairs of rings are required or when the cable or rope stretches or lengthens, as is frequently the case in new cables or ropes. The covering must always be kept full and uniform.

What I claim as my invention, and desire to secure by Letters Patent, is—

1. The clutch-ring D, consisting of the part B and part C, with slots $x x$, united by one part being screwed into the other, in combination with traction-cables, substantially as described.

2. The clutch-ring D and the intermediate plain or loose rings, H, in combination with traction-cables, as shown, and for the purpose set forth.

3. The sectional ring G and wires $j j$, in combination with traction-cables, as shown, and for the purpose set forth.

4. The sectional rings G and plain or loose rings H, in combination with traction-cables, as described, and for the purpose set forth.

CHESTER BULLOCK.

Witnesses:
JOHN T. DEWEESE,
HOWARD WAGNER.